(12) United States Patent
Hayashi et al.

(10) Patent No.: US 8,814,200 B2
(45) Date of Patent: Aug. 26, 2014

(54) AIRBAG DEVICE

(75) Inventors: Shinji Hayashi, Tokyo (JP); Yutaka Kitaike, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/119,369

(22) PCT Filed: Apr. 5, 2012

(86) PCT No.: PCT/JP2012/059307
§ 371 (c)(1),
(2), (4) Date: Nov. 21, 2013

(87) PCT Pub. No.: WO2012/160885
PCT Pub. Date: Nov. 29, 2012

(65) Prior Publication Data
US 2014/0097600 A1    Apr. 10, 2014

(30) Foreign Application Priority Data

May 25, 2011 (JP) ................................. 2011-117497

(51) Int. Cl.
*B60R 21/205* (2011.01)
*B60R 21/215* (2011.01)

(52) U.S. Cl.
USPC ....................................... 280/728.3; 280/732

(58) Field of Classification Search
USPC ............................. 280/728.3, 732
See application file for complete search history.

(56) References Cited

U.S. PATENT DOCUMENTS 5,941,558 A * 8/1999 Labrie et al. ............... 280/728.3
6,131,943 A * 10/2000 Breitweg .................... 280/728.3
6,237,936 B1 * 5/2001 Quade et al. ............... 280/730.2
6,325,415 B1 * 12/2001 Zelinski et al. ............. 280/743.2
6,543,802 B1 4/2003 Uchiyama et al.
8,657,328 B2 * 2/2014 Ory ............................ 280/728.3

FOREIGN PATENT DOCUMENTS

| JP | H07-291070 A | 11/1995 |
| JP | 2000-301996 A | 10/2000 |
| JP | 2000-326813 A | 11/2000 |
| JP | 2001-097162 A | 4/2001 |
| JP | 2001-191887 A | 7/2001 |
| JP | 2001-347914 A | 12/2001 |
| JP | 2002-050449 A | 2/2002 |
| JP | 2003-306113 A | 10/2003 |
| JP | 2004-237764 A | 8/2004 |
| JP | 3822578 B2 | 6/2006 |
| JP | 2011-031777 A | 2/2011 |

OTHER PUBLICATIONS

International Search Report from the International Bureau of WIPO for International Application No. PCT/JP2012/059307 dated Jul. 3, 2012 (4 pages).

* cited by examiner

*Primary Examiner* — Drew Brown
(74) *Attorney, Agent, or Firm* — Fitch, Even, Tabin & Flannery, LLP (57) ABSTRACT

An airbag device includes an airbag, an inflator, a retainer and an airbag cover. The airbag is usually folded, and expands and develops in an emergency. The inflator supplies gas to the airbag. The retainer secures the airbag and the inflator. The airbag cover houses the airbag. The airbag cover has a plate-like part and an inner case. The plate-like part constitutes the interior surface of a vehicle. The inner case is disposed on the rear surface of the plate-like part and constitutes an expansion and development path for the airbag. The inner case has a plurality of retaining holes for retaining the retainer. The retainer has a roughly planar-shaped support body capable of being stored within the inner case and an annular belt-like body inserted into the retaining holes and attached to the support body.

10 Claims, 9 Drawing Sheets

AIRBAG DEVICE

CROSS-REFERENCE TO RELATED APPLICATIONS

This application is a U.S. national phase application filed under 35 U.S.C. §371 of International Application No. PCT/JP2012/059307, filed on Apr. 5, 2012, designating the United States, which claims priority from Japanese Application No. 2011-117497, filed May 25, 2011, which are hereby incorporated herein by reference in their entirety.

TECHNICAL FIELD

The present invention relates to an airbag device, particularly, to an airbag device of which a weight reduction can be accomplished.

BACKGROUND ART

It is common that a vehicle, such as an automobile, is equipped with an airbag device which inflates and deploys an airbag inside the vehicle to absorb an impact exerted on an occupant in an emergency such as collision or rapid deceleration. Typically, this airbag device has an airbag that is folded under a normal condition and is inflated and deployed in an emergency; an inflator that supplies gas to the airbag; a retainer that fixes the airbag and the inflator; and an airbag cover that covers the airbag.

In the event of a collision or rapid deceleration of the vehicle, gas is supplied from the inflator to the airbag and the airbag is inflated, the airbag cover is cleaved, and the airbag is released to the inside of the vehicle to be inflated and deployed. In particular, in a front passenger seat airbag device, the airbag is inflated and deployed in a space defined by an instrument panel, a windshield (front glass) and the occupant.

There are many retainers made of a metallic material to stand against an impact when the airbag is inflated and deployed or the occupant collides with the airbag (for example, refer to Japanese Patent Application Publication No. 2001-097162 A). In the airbag device disclosed in Japanese Patent Application Publication No. 2001-097162 A, a retainer made of a metallic plate is fixed to a portion of the instrument panel by use of an installation bolt.

In addition, a retainer, of which a portion is made of a synthetic resin for the weight reduction thereof, has already been proposed (for example, refer to Japanese Patent Application Publication No. 2000-326813 A). In the airbag device disclosed in Japanese Patent Application Publication No. 2000-326813 A, a lower retainer for retaining the inflator is made of a metal, and an upper retainer for retaining the airbag is made of a synthetic resin. The lower retainer is fixed to the upper retainer by use of a bolt, and a protrusion of the upper retainer is fitted into the airbag cover (lid) to be fixed. In this configuration, a weight reduction is accomplished by the upper retainer and an impact is absorbed by the lower retainer.

As illustrated, in many cases, the retainer is fixed to the instrument panel or the airbag cover by use of a fastener such as a rivet or a bolt, or the protrusion of the retainer is fitted into the instrument panel or the airbag cover to be fixed, and thus the retainer is positioned. However, in recent years, as disclosed in Japanese Patent No. 3822578 B2, a configuration is increasing in which a hook arranged in the retainer is engaged with an opening formed in the airbag cover (lid) while being movable relative to each other so that the retainer can be positioned in a floating shape. In this configuration, an impact from the airbag is mitigated and assemblability is improved.

SUMMARY OF THE INVENTION

The retainer has a rectangular box-like shape with an open upper portion, and the inflator and the airbag are fixed to a bottom portion of the retainer. Accordingly, when the airbag is inflated and deployed, the airbag, to which gas is supplied from the inflator, is inflated and deployed from the bottom portion side of the retainer and presses side wall portions of the retainer. As a result, the opening in the upper portion of the retainer is deformed to have an approximately circular shape. In addition, typically, the airbag cover (lid) is molded from a synthetic resin and is likely to be deformed due to an inflation pressure of the airbag. Accordingly, when the retainer is connected to the airbag cover, the opening in the upper portion of the retainer is deformed to have an approximately circular shape in line with the deformation of the airbag cover.

Typically, this deformation is referred to as a "fish-mouth phenomenon", and countermeasures against the fish-mouth phenomenon are required to design the retainer. In a metallic retainer in the related art, the following are incorporated as countermeasures against the fish-mouth phenomenon: an increase in the thickness of a plate; the addition of a reinforcement member; an increase in the number of welding points; and an increase in the strength or rigidity of the retainer. However, there is a problem that these countermeasures against the fish-mouth phenomenon increase the weight of the retainer and hinder the weight reduction of the airbag device.

In addition, examination has been made to adopt a metallic retainer which is made of a resin or is subject only to a bending-drawing process for the weight reduction thereof. However, there are problems that these retainers lack strength and it is not easy to put these retainers into practice in light of being a countermeasure against the fish-mouth phenomenon.

The present invention is made in light of these problems, and an object of the present invention is to provide an airbag device that can prevent a fish-mouth phenomenon and accomplish the weight reduction of a retainer.

According to the present invention, an airbag device to be provided includes: an airbag that is folded under a normal condition and that is inflated and deployed in an emergency; an inflator that supplies gas to the airbag; a retainer that fixes the airbag and the inflator; and an airbag cover that accommodates the airbag, characterized in that the airbag cover includes a plate-shaped portion which configures an interior surface of a vehicle and an inner case which is arranged on a back surface of the plate-shaped portion to configure an inflation-deployment path of the airbag, and the inner case has a plurality of retaining holes for retaining the retainer, and the retainer includes a supporting body which has an approximately flat plate shape accommodable in the inner case and a belt-shaped body which is inserted into the retaining holes and installed onto the supporting body to form an annular shape.

The belt-shaped body is made of, for example, a base fabric used on the airbag, webbing used on a seat belt, a thin plate-shaped metal, or a fiber material or a resin material which strength stands against a force and an impact caused by the inflation and deployment of the airbag. And, a portion of the belt-shaped body may be connected to the airbag.

The retaining holes may be formed in a pair of wall surfaces which face each other approximately in a forward and backward direction of the vehicle or a pair of wall surfaces which configure the inner case in a longitudinal direction thereof; and formed in a pair of wall surfaces which face each other approximately in a left and right direction of the vehicle or a pair of wall surfaces which configure the inner case in a lateral direction thereof. And, the retaining holes may have a shape in which the belt-shaped body can be retained in a loose fit state.

The inner case may have locking holes which lock the retainer in a loose fit state, and the retainer may have hooks which are formed in the supporting body and can be locked into the locking holes. And, the retaining holes may be formed in a pair of wall surfaces which face each other approximately in a forward and backward direction of the vehicle or a pair of wall surfaces which configure the inner case in a longitudinal direction thereof, and the locking holes may be formed in a pair of wall surfaces which face each other approximately in a left and right direction of the vehicle or a pair of wall surfaces which configure the inner case in a lateral direction thereof.

The belt-shaped body may be fixed to the supporting body from an outside by use of a rivet or the belt-shaped body may be fixed to the supporting body by use of a bolt and a nut. And, the airbag device may include a backplate that fixes the airbag to a periphery of the inflator; and a bracket that connects the retainer to an in-vehicle structure, and the supporting body and the belt-shaped body may be interposed between the backplate and the bracket to be fixed to each other by use of a bolt.

The airbag cover may be configured to be formed separately from an instrument panel of the vehicle to be fixed to the instrument panel, or the airbag cover may be integrally formed with the instrument panel of the vehicle.

In the airbag device according to the present invention described above, since the retainer is formed to have a flat plate shape, the retainer does not have the side wall portions which are a cause of the fish-mouth phenomenon and the occurrence of the fish-mouth phenomenon can be prevented. In addition, since the belt-shaped body is used as means for engaging the retainer and the airbag cover (inner case) with each other, the retainer and the airbag cover (inner case) can be easily connected to each other even though the retainer is formed to have a flat plate shape. In addition, since it is preferable for the retainer not to have the side wall portions but the minimum area necessary for installing the inflator or the belt-shaped body, the weight reduction of the retainer and the weight reduction of the airbag device can be accomplished.

In addition, the belt-shaped body is made of a particular material such as a base fabric or webbing, and thus the belt-shaped body can be easily formed to have a strength which stands against a force and an impact caused by the inflation and deployment of the airbag.

In addition, when a portion of the belt-shaped body is connected to the airbag, the airbag and the belt-shaped body can be handled like a single part during the manufacturing of the airbag device, and work of fixing the connected parts to the supporting body can be easily processed.

In addition, the retaining holes are formed in the wall surfaces in the forward and backward and the left and right directions of the vehicle and the belt-shaped body is bridged between the retainer and the airbag cover (inner case), and thus a gap between the retainer and the airbag cover (inner case) in each of the wall surfaces can be reduced by the amount of the width of the belt-shaped body, and the airbag can be suppressed from being squeezed out to the outside when the airbag is inflated and deployed.

In addition, since the retaining holes are formed in such a manner that the belt-shaped body can be loosely fitted into the retaining holes, particularly, the retaining holes are formed to have a clearance in a thickness direction of the belt-shaped body, the belt-shaped body (that is, retainer) can be moved toward a direction where the airbag is inflated and deployed and an impact can be mitigated when the airbag is inflated and deployed.

In addition, since the supporting body has hooks that can be locked to the inner case, the supporting body can be locked to the inner case during the manufacturing of the airbag device and workability can be improved.

In addition, since the belt-shaped body is connected to the inner case in the longitudinal direction thereof (the forward and backward direction of the vehicle) and the hooks are connected to the inner case in the lateral direction thereof (the left and right direction of the vehicle), the number of the belt-shaped bodies can be reduced, and the supporting body can be locked to the inner case during the manufacturing of the airbag device, and the workability can be improved.

In addition, when a rivet fastening is adopted as means for fixing the belt-shaped body and the supporting body, the belt-shaped body can be easily installed onto the retainer from the outside thereof. In addition, when a bolt fastening is adopted as means for fixing the belt-shaped body and the supporting body, the installation of the belt-shaped body and the supporting body can be easily and firmly done and the installation is detachable, and the reassembly or dismantlement thereof can be easily performed.

In addition, since the supporting body and the belt-shaped body are interposed between the backplate and the bracket, a structure, which stands against a certain fastening force, can be formed even though the retainer is made of a resin, and these parts can be easily fixed by use of bolts.

In addition, the airbag cover is fitted into or integrated with the instrument panel, and thus the airbag device according to the present invention can be easily applied depending on various forms of the airbag device.

DESCRIPTION OF THE EMBODIMENTS

Figure 1A:
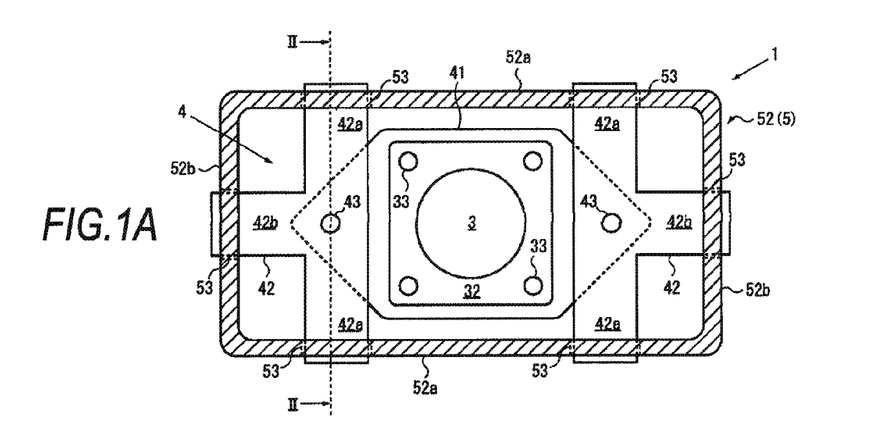
FIGS. 1A, 1B and 1C illustrate an airbag device according to a first embodiment of the present invention, of which 1A is a horizontal cross-sectional view, 1B is a bottom view, and 1C is a top view of a retainer.
Figure 1B:
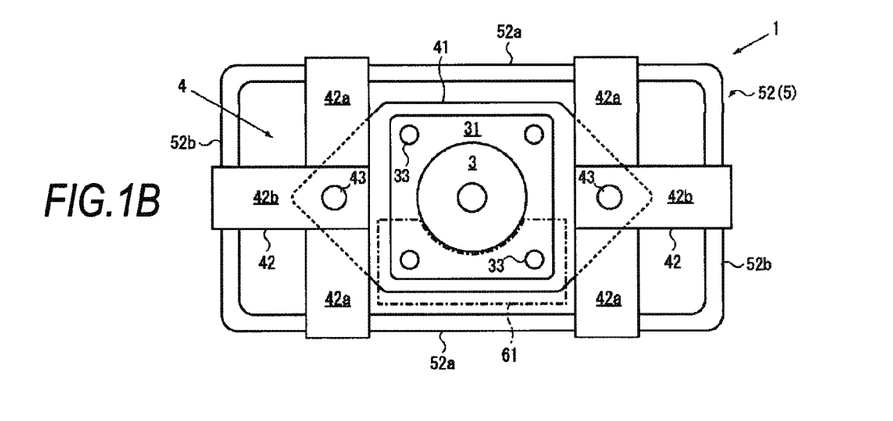
Figure 1C:
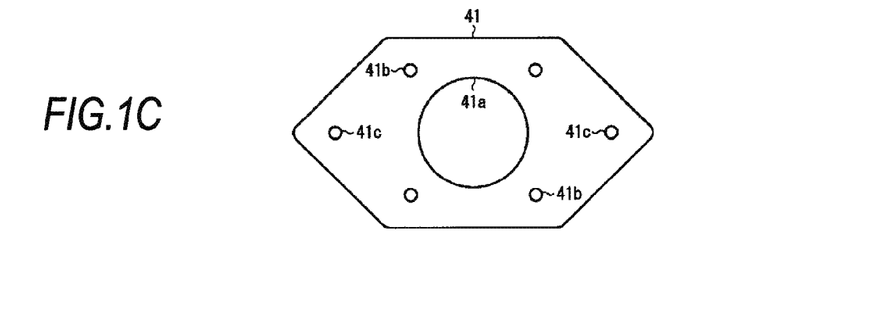
Figure 2:
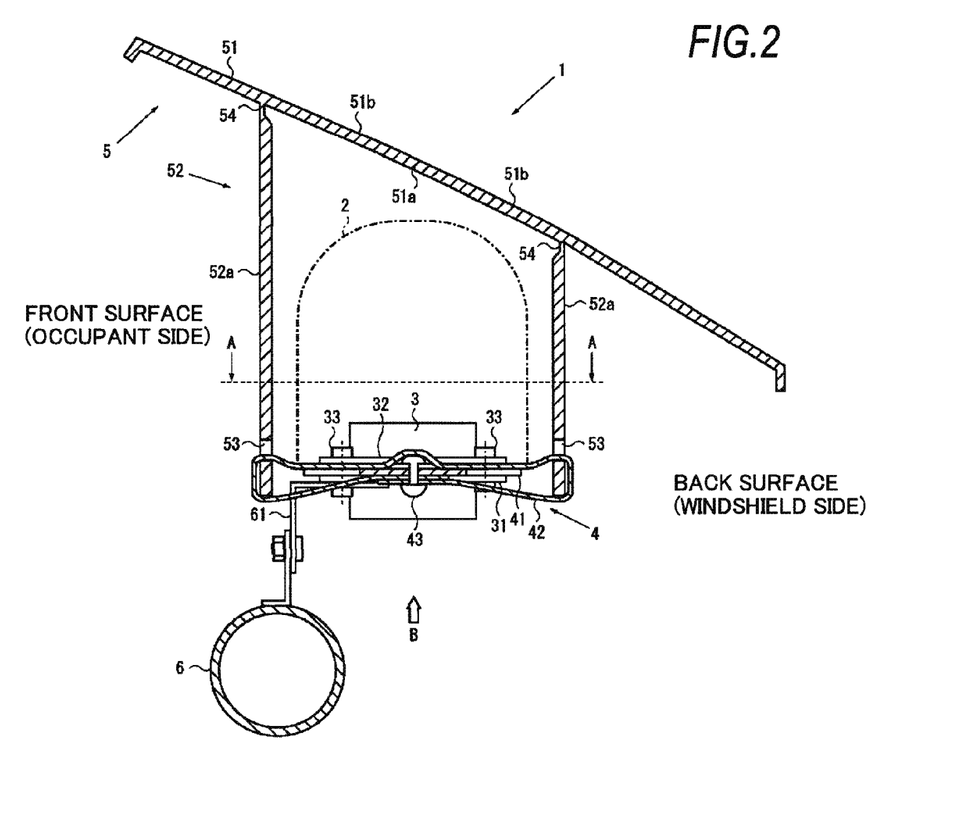
FIG. 2 is a cross-sectional view taken along II-II arrow in FIG. 1A.
Figure 3A:
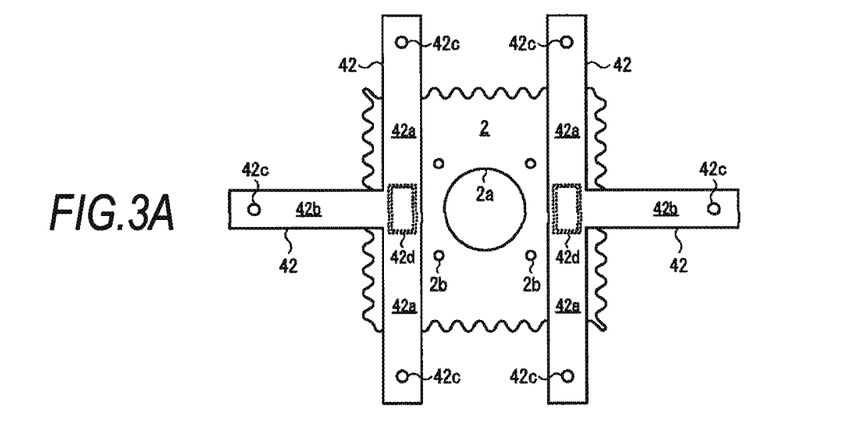
FIGS. 3A, 3B and 3C illustrate top views showing methods of connecting a belt-shaped body and an airbag to each other, of which 3A illustrates a first example, 3B illustrates a second example, and 3C illustrates a third example.
Figure 3B:
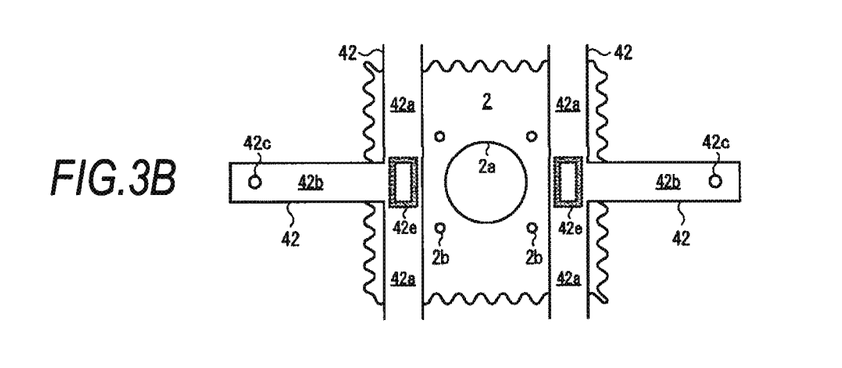

Hereinafter, embodiments of an airbag device 1 according to the present invention will be described with reference to FIGS. 1 to 9. Herein, FIGS. 1A to 1C illustrate an airbag device according to a first embodiment of the present invention, of 1A is a horizontal cross-sectional view, 1B is a bottom view, and 1C is atop view of a retainer. FIG. 2 is a cross-sectional view taken along II-II arrow in FIG. 1A. FIGS. 3A to 3B illustrate top views showing methods of connecting a belt-shaped body and an airbag to each other, of which 3A illustrates a first example, 3B illustrates a second example, and 3C illustrates a third example. That is, the horizontal cross-sectional view in FIG. 1A is equivalent to a cross-sectional view taken along A-A arrow in FIG. 2. The bottom view in FIG. 1B is equivalent to a view taken in the direction of an arrow B in FIG. 2. In addition, in FIGS. 1A and 1B, an airbag 2 is not illustrated.

Figure 3C:
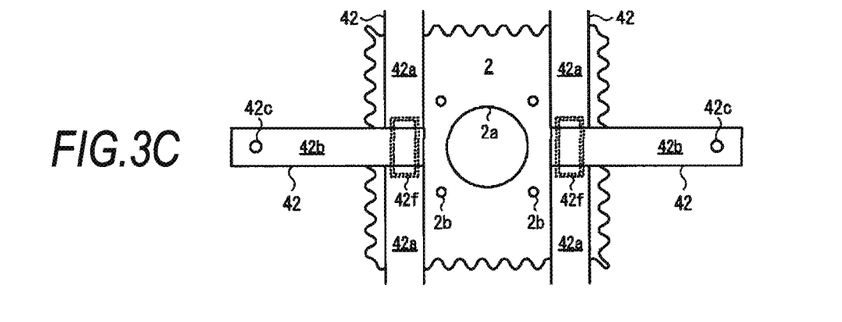

As illustrated in FIGS. 1 to 3, the airbag device 1 according to the first embodiment of the present invention has the airbag 2 that is folded under a normal condition and is inflated and deployed in an emergency; an inflator 3 that supplies gas to the airbag 2; a retainer 4 that fixes the airbag 2 and the inflator 3; and an airbag cover 5 that accommodates the airbag 2. The airbag cover 5 has a plate-shaped portion 51 that configures an interior surface of a vehicle and an inner case 52 that is arranged on a back surface of the plate-shaped portion 51 to configure an inflation-deployment path of the airbag 2, and the inner case 52 has a plurality of retaining holes 53 for retaining the retainer 4. The retainer 4 has a supporting body 41 that has an approximately flat plate shape accommodable in the inner case 52 and belt-shaped bodies 42 that are inserted into the retaining holes 53 and installed onto the supporting body 41 to form an annular shape (may be a circular shape or a loop shape).

The airbag device 1 is a front passenger seat airbag device and is mounted in an instrument panel (not illustrated) arranged in a front surface of a front passenger seat. Accordingly, an upper surface of the airbag cover 5 (plate-shaped portion 51) forms a portion of the instrument panel and configures a portion of the interior surface of the vehicle. In FIG. 2, the right side illustrates the back surface (windshield side), and the left side illustrates the front surface (occupant side).

The inflator 3 is a gas generator that generates gas to be supplied to the airbag 2, and, for example, has an approximately circular plate-shaped appearance. The inflator 3 is fitted into an opening formed in an approximately center portion of the supporting body 41 that configures the retainer 4, and the inflator 3 is fixed to the retainer 4 by use of fasteners 33 such as bolts with the supporting body 41 being interposed between a flange portion 31 and a backplate 32. Herein, a disk type of the inflator 3 is illustrated, but a cylinder type, which has an approximately columnar shaped appearance, may be used.

The inflator 3 is connected to an ECU (electronic control unit), which is not illustrated, and is controlled based on measured values from an acceleration sensor and the like. When the ECU senses or predicts the collision or rapid deceleration of the vehicle, the inflator 3 is ignited by an ignition current from the ECU to cause the combustion of an agent contained in the inflator 3 to generate gas and supply gas to the airbag 2.

The airbag 2 is fixed to the retainer 4 by use of the fasteners 33 with the airbag 2 being interposed between the backplate 32 and the supporting body 41 which configures the retainer 4. As illustrated by a chain line in FIG. 2, the airbag 2 is fixed to the retainer 4 with the airbag 2 being folded under a normal condition. A wrapping cloth (not illustrated) may be arranged to wrap the folded airbag 2 therein in order to retain a state of the airbag 2 being folded.

As illustrated in FIG. 2, the plate-shaped portion 51 and the inner case 52 are integrated with each other to form the airbag cover 5. The plate-shaped portion 51 and the inner case 52 may be integrally molded by injection molding, and the inner case 52 may be welded to the back surface of the plate-shaped portion 51 in such a manner that the inner case 52 and the plate-shaped portion 51 are integrally configured. A structure and shape of the airbag cover 5 is not limited to the structure and shape which are illustrated, and the airbag cover used in the related art can be appropriately used, for example, in which the inner case 52 is arranged approximately vertically with respect to the plate-shaped portion 51.

For example, the plate-shaped portion 51 is a member that configures a portion of the interior surface of the vehicle such as an instrument panel. A tear line 51a with a thin thickness is formed in an area of the plate-shaped portion 51, which is positioned inside the inner case 52, in such a manner that the plate-shaped portion 51 is cleaved to align with a desired shape when the airbag 2 is inflated and deployed. For example, the tear line 51a is formed in an approximately H shape, and the plate-shaped portion 51 is cleaved into a pair of door portions 51b to be swung open around hinge portions 54. For example, the tear line 51a may be formed in an approximately U shape in such a manner that a single door is swung open.

In addition, the airbag cover 5 may be configured to be formed separately from the instrument panel (not illustrated) of the vehicle to be fixed to the instrument panel. The airbag cover 5 may be integrally formed with the instrument panel of the vehicle. When the airbag cover 5 is fitted into the instrument panel, the outer periphery of the plate-shaped portion 51 is formed to be mountable on a concave portion that is formed at the edge of an opening of the instrument panel, and pins or engagement pieces are arranged in the outer periphery to fix the plate-shaped portion 51 to the instrument panel. In addition, when the airbag cover 5 is integrally formed with the instrument panel, the plate-shaped portion 51 configures the instrument panel. As such, the airbag cover 5 is a fit-in type or an integral type to be able to cope with various forms of the airbag device.

The inner case 52 is configured to form a rectangular cylinder-shape with wall surfaces erected on the back surface of the plate-shaped portion 51. Specifically, the inner case 52 has a pair of first wall surfaces 52a which face each other approximately in a forward and backward direction of the vehicle and a pair of second wall surfaces 52b which face each other approximately in a left and right direction of the vehicle. Typically, the first wall surfaces 52a are a pair of wall surfaces which configure the inner case 52 in a longitudinal direction thereof, and the second wall surfaces 52b are a pair of wall surfaces which configure the inner case 52 in a lateral direction thereof.

The hinge portions 54 are configured by articulated sections that are formed by the plate-shaped portion 51 and the inner case 52. For example, as illustrated in FIG. 2, the hinge portions 54 are configured by portions of which the inner case 52 are formed to have a thin thickness. When the inner case 52 is welded to the plate-shaped portion 51 and the door portions 51b are separated from the plate-shaped portion 51 to be deployed, the hinge portions may be configured by approximately U-shaped portions that are formed in welded portions of the inner case 52.

As illustrated in FIG. 1A, the inner case 52 has the plurality of retaining holes 53 for retaining the retainer 4. For example, two retaining holes 53 are formed in each of the pair of first wall surfaces 52a which configure the inner case 52. In addition, for example, one retaining hole 53 is formed in each of the pair of second wall surfaces 52b which configure the inner case 52. That is, the retaining holes 53 are formed in the pair of first wall surfaces 52a which face each other approximately in the forward and backward direction of the vehicle or which configure the inner case 52 in the longitudinal direction thereof; and the retaining holes 53 are formed in the pair of second wall surfaces 52b which face each other approximately in the left and right direction of the vehicle or which configure the inner case 52 in the lateral direction thereof.

For example, the retaining holes 53 are formed to be long in the left and right direction in such a manner that the retaining holes 53 align with the shape of the belt-shaped bodies 42 to be inserted thereinto. In addition, as illustrated in FIG. 2, the retaining holes 53 have a shape in which the belt-shaped bodies 42 can be retained in a loose fit state. Specifically, the retaining holes 53 have a clearance in a thickness direction of the belt-shaped body 42. The clearance is formed, and thus the belt-shaped bodies 42 (that is, retainer 4) can be moved toward a direction where the airbag 2 is inflated and deployed and an impact can be mitigated when the airbag 2 is inflated and deployed.

As illustrated in FIGS. 1 and 2, the retainer 4 has an approximately flat plate-shaped supporting body 41 and belt-shaped bodies 42 which are connected to the retaining holes 53. For example, as illustrated in FIGS. 1A to 1C, the supporting body 41 is configured to have a polygonal shape (hexagonal shape in FIGS. 1A to 1C with an area in which the supporting body 41 can be accommodated through an opening of the inner case 52. The supporting body 41 has an inflator-purposed opening 41a in a center portion thereof through which the inflator 3 is inserted; inflator-fixing holes 41b which are formed in an outer periphery of the inflator-purposed opening 41a to fix the inflator 3; and belt-shaped body-fixing holes 41c which are formed in both ends thereof to fix the belt-shaped bodies 42. When the following are taken into consideration: the inflator-purposed opening 41a, the inflator-fixing holes 41b and the belt-shaped body-fixing holes 41c can be formed; the supporting body 41 can be greatly reduced in area and be easily molded; and the like, the supporting body 41 can be formed to have a hexagonal shape as illustrated. The supporting body 41 may be made of a metal or a resin, but the supporting body 41 is preferably made of a resin for the weight reduction.

Sequentially from the inside of the airbag device, the back-plate 32, the airbag 2, the supporting body 41 and the flange portion 31 of the inflator 3 are stacked up in an approximately center portion of the supporting body 41 to be connected to each other by use of the fasteners 33. In addition, as illustrated in FIG. 2, sequentially from the inside of the airbag device, the belt-shaped body 42, the supporting body 41 and the belt-shaped body 42 are stacked up on an approximately both ends of the supporting body 41 to be connected to each other by use of rivets 43. That is, the belt-shaped bodies 42 are fixed to the supporting body 41 from the outside by use of the rivets 43. When the supporting body 41 has a strength which stands against a force and an impact caused by the inflation and deployment of the airbag 2, the belt-shaped bodies 42 may be fixed to the supporting body 41 by use of bolts and nuts instead of the rivets 43. A bolt fastening is adopted as fixing means, and thus installation can be easily and firmly done and the installation is detachable and reassembly or dismantlement can be easily performed.

As illustrated in FIG. 1A, the belt-shaped bodies 42 have an approximately T shape with two arms 42a and one leg 42 each, and the arms 42a and the leg 42b are formed to have a belt shape. However, this configuration is only an example, the configuration can be appropriately modified depending on conditions such as the shape of the supporting body 41, the arrangement of the retaining holes 53 and the strength of the belt-shaped body 42. The arms 42a are arranged to be inserted through the retaining holes 53 formed in the first wall surfaces 52a, and the leg 42b is arranged to be inserted through the retaining hole 53 formed in the second wall surface 52b. The belt-shaped bodies 42 are connected to the first wall surfaces 52a and the second wall surfaces 52b in this way, and thus gaps between the retainer 4 and the airbag cover 5 (inner case 52) in the first wall surfaces 52a and the second wall surfaces 52b can be reduced, and the airbag 2 can be suppressed from being squeezed out to the outside when the airbag 2 is inflated and deployed.

In addition, as illustrated in FIG. 3A, fixing holes 42c are formed in ends of the arms 42a and the legs 42b. After the arms 42a and the legs 42b are inserted through the retaining holes 53, the arms 42a and the legs 42b are superimposed on the supporting body 41 to align the fixing holes 42c with the belt-shaped body-fixing holes 41c, respectively, to be connected to each other by use of the rivets 43. In this process, the belt-shaped body 42 configures an annular-shaped portion which is inserted through the retaining holes 53 and the supporting body 41 is retained by the inner case 52 (airbag cover 5). When the bolt fastening is adopted as fixing means, bolt insertion holes may be formed in advance in assembly portions of the arms 42a and the legs 42b.

For example, the belt-shaped body 42 is made of a base fabric used on the airbag 2, webbing used on a seat belt, a thin plate-shaped metal, or a fiber material or a resin material of which the strength stands against a force and an impact caused by the inflation and deployment of the airbag 2. That is, the belt-shaped body 42 has such flexibility that the belt-shaped body 42 can be formed to have an annular shape and has a strength which stands against a force and an impact caused by the inflation and deployment of the airbag 2. Typically, the base fabric used on the airbag 2 or the webbing used on a seat belt easily satisfies these conditions and is readily available. A plurality of sheets of woven fabric materials or fiber materials such as a base fabric and webbing may be superimposed on each other to form a sheet of the belt-shaped body 42.

In particular, since the belt-shaped bodies 42 cannot be seen by an occupant, scraps or rejected pieces of the base fabric or the webbing (for example, a piece with a bad appearance, a piece with the end being loose, or the like) produced in the process of manufacturing the airbag or seat belt apparatuses can be reused, and the amount of waste being produced can be reduced.

In addition, as illustrated in FIGS. 1B and 2, a bracket 61 is mounted on a back surface of the retainer 4 (supporting body 41) to fix the retainer 4 to an in-vehicle structure 6. For convenience of explanation, the bracket 61 is illustrated by a chain line in FIG. 1B. As illustrated in FIG. 1B, the bracket 61 together with a fixing portion of the inflator 3 is fixed to the retainer 4 by use of the fasteners 33. At this time, for example, two locations in the fixing portion of the inflator 3, which are on a side close to the bracket 61, are used, and thus the bracket 61 can be fixed and quantified.

The bracket 61 is not limited to the shape and the structure which are illustrated and are appropriately modified depending on conditions such as the size and material of the retainer 4, a positional relation with the in-vehicle structure 6 to which the bracket 61 is connected and the like. For example, the bracket 61 is formed to have an approximately U shape or an annular shape to be arranged in an outer periphery of the inflator 3, and thus the fixing portion of the inflator 3 may be used in its entirety (four locations). In this configuration, the in-vehicle structure 6 and the retainer 4 can be stably combined with each other.

In addition, as illustrated in FIG. 3A, the belt-shaped bodies 42 may be stitched to the airbag 2 in advance. Each of FIGS. 3A to 3C illustrates only a portion of a base portion of the airbag 2. Typically, the base portion of the airbag 2 has an inflator-purposed opening 2a through which the inflator 3 is inserted and inflator-fixing holes 2b which are formed in an outer periphery of the inflator-purposed opening 2a to fix the inflator 3. The belt-shaped bodies 42 are connected to the base portion of the airbag 2 via stitched portions 42d. Since ends of the rivets 43 are arranged in the assembly portions of the belt-shaped bodies 42, it is required that the stitched portions 42d are formed to avoid the rivets 43. Herein, the belt-shaped bodies 42 are stitched to the airbag 2 in the assembly portions of the belt-shaped bodies 42, but the arms 42a and the leg 42b may be stitched to the airbag 2.

As such, when portions of the belt-shaped bodies 42 are connected to the airbag 2, the airbag 2 and the belt-shaped bodies 42 can be handled like a single part during the manufacturing of the airbag device 1, and work of fixing the connected parts to the supporting body 41 can be easily processed. In this first example, sequentially from the inside of the airbag device, the airbag 2, the belt-shaped body 42, the supporting body 41 and the belt-shaped body 42 are stacked up on each other and are connected to each other by use of the rivets 43.

In a second example as illustrated in FIG. 3B, the belt-shaped bodies 42 are bonded to the airbag 2 by use of an adhesive agent 42e. For example, when the belt-shaped body 42 is formed from the same base fabric as used on the airbag 2, adhesive properties are good and thus a sufficient retaining force is demonstrated by use of the adhesive agent 42e. Certainly, it is not required that the belt-shaped body 42 is necessarily made of the base fabric, and, even though the belt-shaped body 42 is made of a woven fabric such as webbing or a fiber material such as a cloth, the belt-shaped bodies 42 can be connected to the airbag 2 by use of the adhesive agent 42e.

In a third example as illustrated in FIG. 3C, the arm 42a and the leg 42b are configured to be parts separate from each other. In this case, since both of the arm 42a and the leg 42b are required to be connected to the airbag 2, a connection between the arm 42a and the leg 42b by a stitched portion 42f and a connection of the arm 42a and the leg 42b to the airbag 2 are simultaneously processed while the arm 42a and the leg 42b are superimposed on the airbag 2. Certainly, as in the second example, the connection of the arm 42a to the airbag 2 and the connection of the arm 42a to the leg 42b may be done by use of the adhesive agent.

In the airbag device 1 according to the first embodiment described above, since the retainer 4 is formed to have a flat plate shape, the retainer 4 does not have the side wall portions which are a cause of the fish-mouth phenomenon and the occurrence of the fish-mouth phenomenon can be prevented.

In addition, since the belt-shaped body 42 is used as means for engaging the retainer 4 and the airbag cover 5 (inner case 52) with each other, the retainer 4 and the airbag cover 5 (inner case 52) can be easily connected to each other even though the retainer 4 is formed to have a flat plate shape. In addition, since it is preferable for the retainer 4 not to have the side wall portions but the minimum area necessary for installing the inflator 3 or the belt-shaped body 42, the weight reduction of the retainer 4 and the weight reduction of the airbag device 1 can be accomplished.

Subsequently, the airbag device 1 according to a second embodiment of the present invention will be described with reference to FIGS. 4 and 5. Herein, FIGS. 4A to 4C illustrate an airbag device according to the second embodiment of the present invention, of which 4A is a horizontal cross-sectional view, 4B is a bottom view, and 4C is a cross-sectional view of a supporting body taken along C-C in FIG. 4B. FIG. 5 is a view taken in the direction of an arrow V in FIG. 4A. The same numerals are assigned to the same component parts as in the airbag device 1 according to the first embodiment, and duplicated descriptions will be omitted.

Figure 4A:
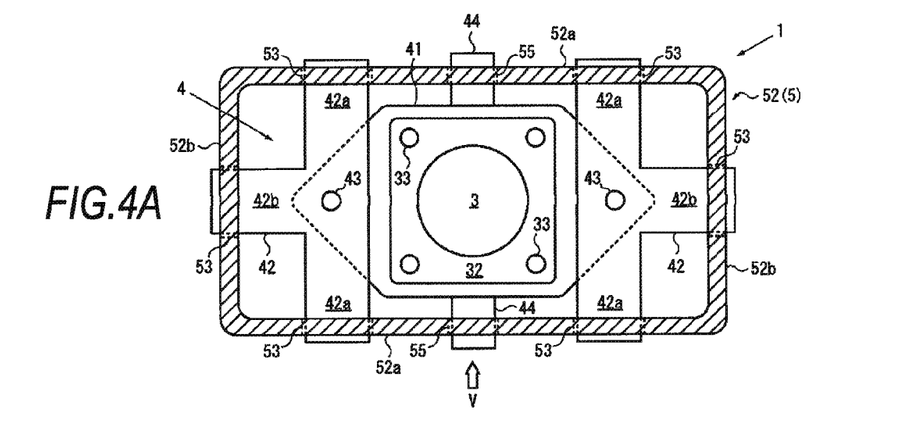
FIGS. 4A, 4B and 4C illustrate an airbag device according to a second embodiment of the present invention, of which 4A is a horizontal cross-sectional view, 4B is a bottom view, and 4C is a cross-sectional view of a supporting body taken along C-C in FIG. 4B.
Figure 4B:
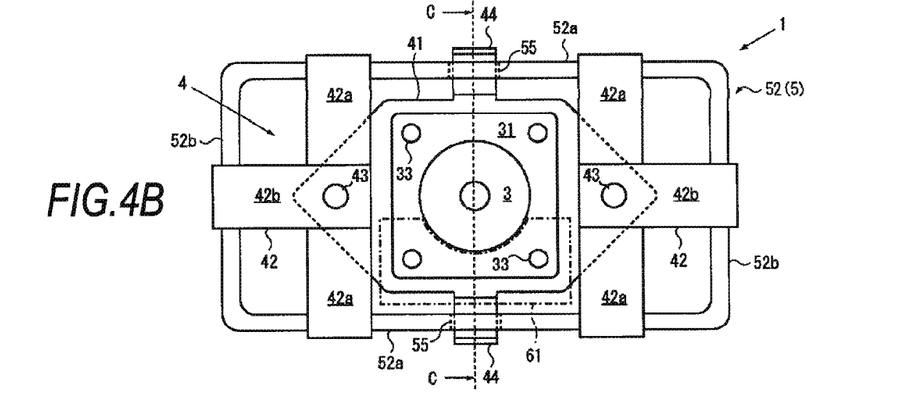
Figure 4C:
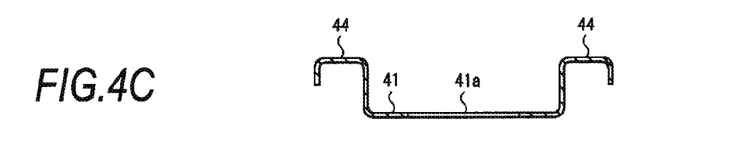
Figure 5:
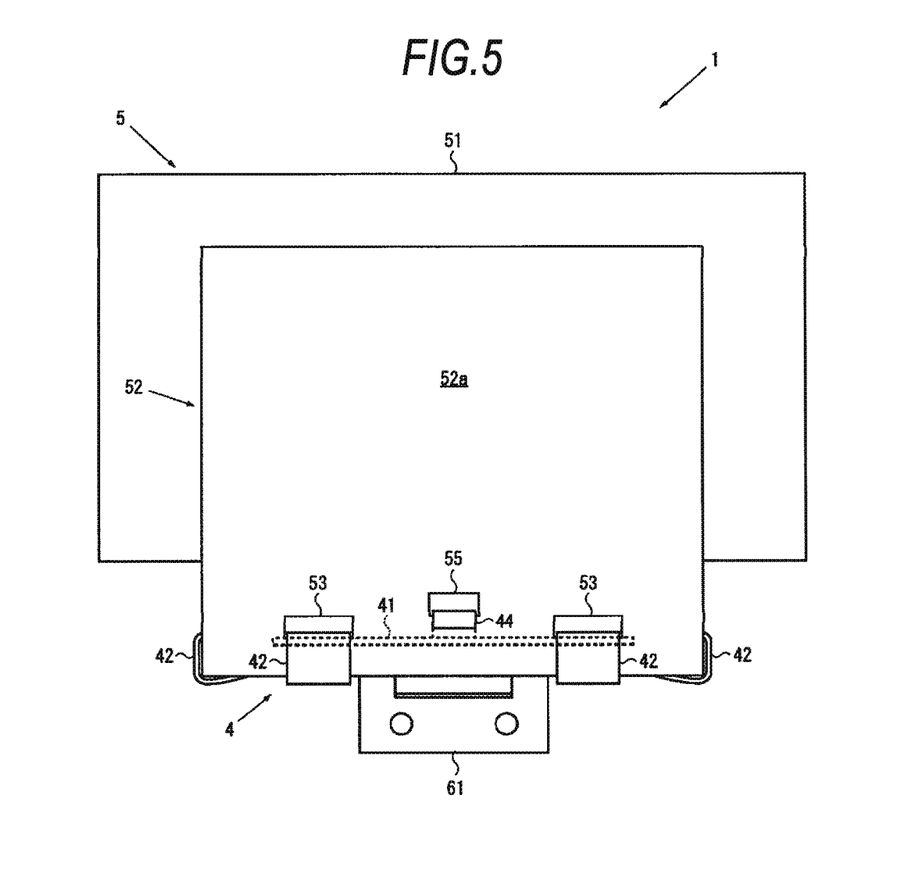
FIG. 5 is a view taken in the direction of an arrow V in FIG. 4A.

In the second embodiment as illustrated in FIGS. 4 and 5, the inner case 52 has locking holes 55 that lock the retainer 4 in a loose fit state, and the retainer 4 has hooks 44 that are formed in the supporting body 41 and can be locked into the locking holes 55. These locking holes 55 and the hooks 44 are formed. Accordingly, when the retainer 4 is connected to the airbag cover 5, the retainer 4 (supporting body 41) can be locked into the locking holes 55, and work such as the insertion of the belt-shaped body 42 or the fixation of the rivets 43 can be easily done, and workability can be improved.

As illustrated in FIGS. 4A to 4C, the hooks 44 are a pair of plate-shaped members which are erected at ends of the supporting body 41 in the forward and backward direction of the vehicle, and the hooks 44 have an approximately reverse J shape with the tips being bent toward the outside. Since the hooks 44 are not parts of retaining a load when the airbag 2 is inflated and deployed, the hooks 44 can be configured to be inferior in strength to engagement hooks in the related art and the weight reduction thereof can be accomplished.

As illustrated in FIG. 5, the locking holes 55 are formed at positions which correspond to the position and height where the hooks 44 are formed. Herein, since the hooks 44 are formed in the ends of the supporting body 41 in the forward and backward direction of the vehicle, the locking holes 55 are formed in the first wall surfaces 52a. The number of the locking holes 55 being formed corresponds to the number of the hooks 44. In addition, the locking holes 55 have a clearance in a thickness direction of the hook 44. For example, the locking holes 55 are formed to have a clearance in size equivalent to or larger than a clearance of the retaining holes 53. Since this clearance is formed, the hooks 44 can be moved toward the direction where the airbag 2 is inflated and deployed and the belt-shaped bodies 42 and the supporting body 41 cannot be hindered from being floated.

Subsequently, the airbag device 1 according to a third embodiment of the present invention will be described with reference to FIG. 6. Herein, FIGS. 6A to 6C illustrate an airbag device according to the third embodiment of the present invention, of which 6A is a horizontal cross-sectional view, 6B is a bottom view, and 6C is a cross-sectional view of a supporting body taken along C-C in FIG. 6B. The same numerals are assigned to the same component parts as in the airbag device 1 according to the first embodiment, and duplicated descriptions will be omitted.

Figure 6A:
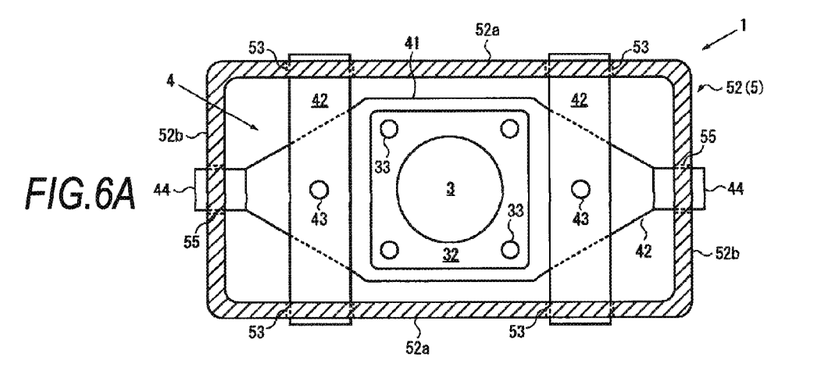
FIGS. 6A, 6B and 6C illustrate an airbag device according to a third embodiment of the present invention, of which 6A is a horizontal cross-sectional view, 6B is a bottom view, and 6C is a cross-sectional view of a supporting body taken along C-C in FIG. 6B.
Figure 6B:
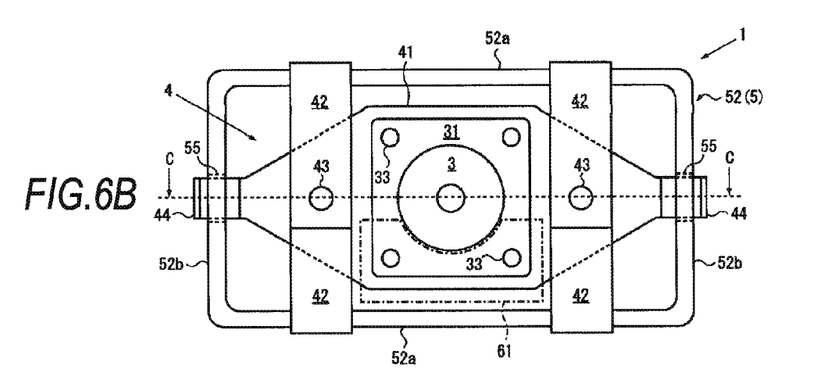
Figure 6C:
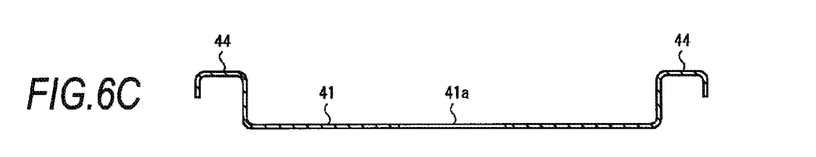

In the third embodiment as illustrated in FIGS. 6A to 6C, the retaining holes 53 are formed in a pair of the first wall surfaces 52a which face each other approximately in the forward and backward direction of the vehicle (a pair of wall surfaces which configure the inner case 52 in the longitudinal direction thereof), and the locking holes 55 are formed in a pair of the second wall surfaces 52b which face each other approximately in the left and right direction of the vehicle (a pair of wall surfaces which configure the inner case 52 in the lateral direction thereof). In this configuration, since the belt-shaped bodies 42 are connected to the inner case 52 in the forward and backward direction of the vehicle (in the longitudinal direction of the inner case 52), and the hooks 44 are connected to the inner case 52 in the left and right direction of the vehicle (in the lateral direction of the inner case 52), the number of the belt-shaped bodies 42 can be reduced, and the supporting body 41 can be locked to the inner case 52 during the manufacturing of the airbag device 1, and the workability can be improved.

In the third embodiment, the hooks 44 are a pair of plate-shaped members which are erected at ends of the supporting body 41 in the left and right direction of the vehicle, and the hooks 44 have an approximately reverse J shape with the tips being bent toward the outside. In addition, not only the hooks 44 lock the supporting body 41 to the inner case 52, but also the hooks 44 reduce gaps between the retainer 4 and the inner case 52 in the left and right direction of the vehicle (in the lateral direction of the inner case 52) and are required to have a certain strength since the hooks 44 serve to suppress the airbag 2 from being squeezed out to when the airbag 2 is inflated and deployed.

The configuration is not illustrated. However, the hooks 44 may be connected to the inner case 52 in the forward and backward direction of the vehicle (in the longitudinal direction of the inner case 52), and the belt-shaped bodies 42 may be connected to the inner case 52 in the left and right direction of the vehicle (in the lateral direction of the inner case 52).

Subsequently, the airbag device 1 according to a fourth embodiment of the present invention will be described with reference to FIG. 7. Herein, FIGS. 7A and 7B illustrate an airbag device according to the fourth embodiment of the present invention, of which 7A is a horizontal cross-sectional view and 7B is a bottom view. The same numerals are assigned to the same component parts as in the airbag device 1 according to the first embodiment, and duplicated descriptions will be omitted.

Figure 7A:
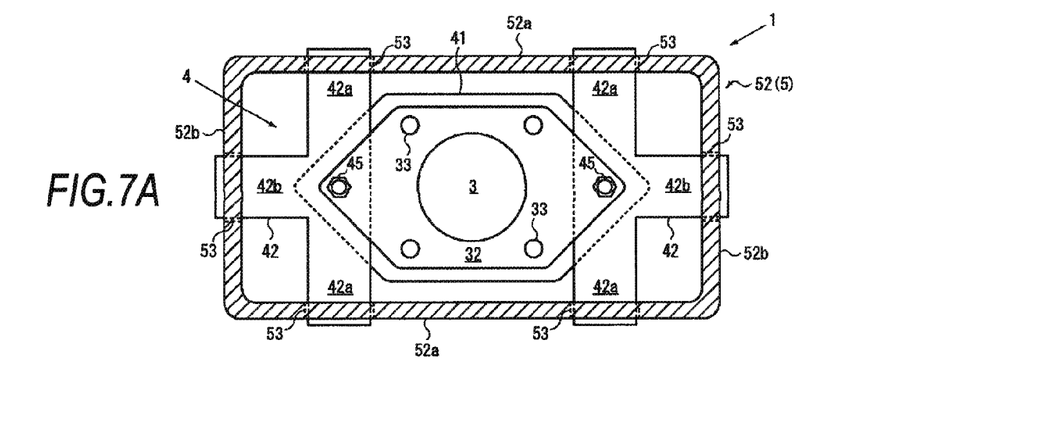
FIGS. 7A and 7B illustrate an airbag device according to a fourth embodiment of the present invention, of which 7A is a horizontal cross-sectional view and 7B is a bottom view.
Figure 7B:
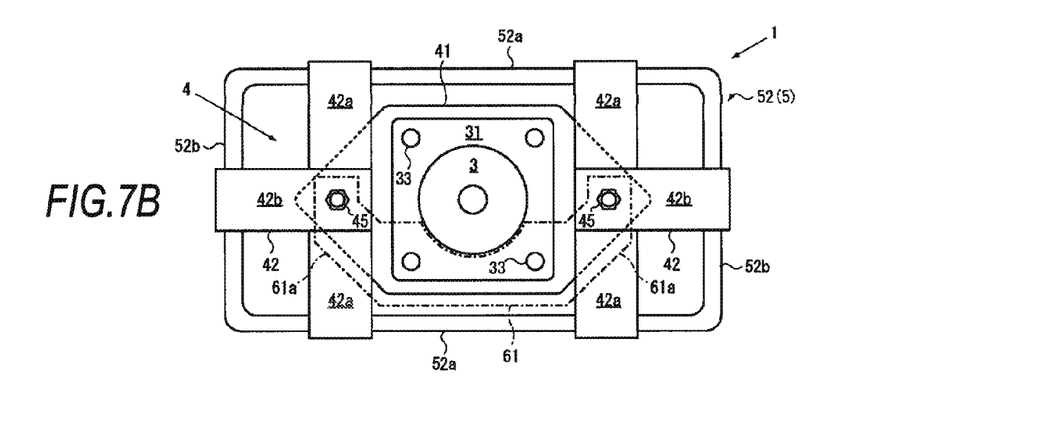

The fourth embodiment as illustrated in FIGS. 7A and 7B has a backplate 32 that fixes the airbag 2 to a periphery of the inflator 3 and the bracket 61 that connects the retainer 4 to the in-vehicle structure 6. The supporting body 41 and the belt-shaped bodies 42 are interposed between the backplate 32 and the bracket 61 to be fixed to each other by use of the bolts 45. For convenience of explanation, the bracket 61 is illustrated by a chain line in FIG. 7B.

As illustrated in FIG. 7A, the backplate 32 has a polygonal shape approximately similar to the shape of the supporting body 41, and belt-shaped body-fixing holes are formed in both ends of the backplate 32 to be aligned with the belt-shaped body-fixing holes 41c of the supporting body 41. In addition, as illustrated in FIG. 7B, the bracket 61 has a pair of extension portions 61a that are extended along the longitudinal direction of the inner case 52, and belt-shaped body-fixing holes are formed in the extension portions 61a to be aligned with the belt-shaped body-fixing holes 41c of the supporting body 41.

In this fourth embodiment, sequentially from the inside of the airbag device, the backplate 32, the airbag 2, the belt-shaped body 42, the supporting body 41, the belt-shaped body 42 and the bracket 61 are stacked up on each other and are fastened with each other by use of the bolts 45 which are inserted from one side of the backplate 32 or the bracket 61 and the nuts are inserted from the other side thereof. That is, the belt-shaped bodies 42 are fixed to the supporting body 41 by use of the bolts 45 and nuts (not illustrated). In this configuration, even though the supporting body 41 is made of a resin, the backplate 32 and the bracket 61 are made of a metal and thus the supporting body 41 can be interposed between the backplate 32 and the bracket 61 to be fixed by use of the bolts 45.

Subsequently, the airbag device 1 according to a fifth embodiment of the present invention will be described with reference to FIG. 8. Herein, FIGS. 8A and 8B illustrate an airbag device according to the fifth embodiment of the present invention, of which 8A is a bottom view and 8B illustrates a cross-sectional view taken along B-B arrow in FIG. 8A. The same numerals are assigned to the same component parts as in the airbag device 1 according to the first embodiment, and duplicated descriptions will be omitted.

Figure 8A:
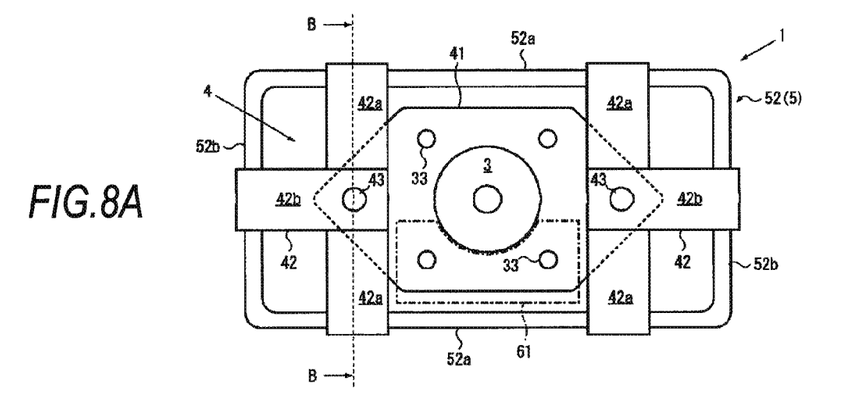
FIGS. 8A and 8B illustrate an airbag device according to a fifth embodiment of the present invention, of which 8A is a bottom view and 8B illustrates a cross-sectional view taken along B-B arrow in FIG. 8A.
Figure 8B:
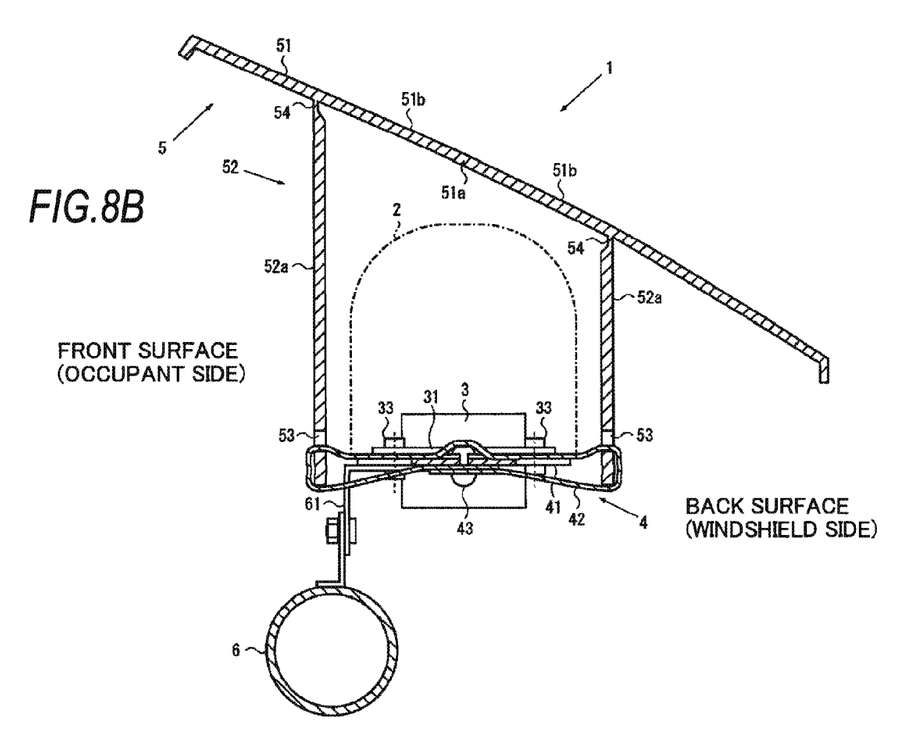

In the fifth embodiment as illustrated in FIGS. 8A and 8B, the backplate 32 is removed. Specifically, according to the first embodiment, the flange portion 31 of the inflator 3 is arranged at the position where the backplate 32 is placed, and the airbag 2 is interposed between the supporting body 41 and the flange portion 31 to be fixed by use of the fasteners 33. In this configuration, when the supporting body 41 is made of a metal, the backplate 32 can be removed and the weight reduction of the airbag device 1 can be accomplished.

For example, in this fifth embodiment, similar to the backplate 32 illustrated in FIG. 7A, the flange portion 31 may have a polygonal shape approximately similar to the shape of the supporting body 41. Belt-shaped body-fixing holes may be formed in both ends of the flange portion 31 to be aligned with the belt-shaped body-fixing holes 41c of the supporting body 41. In addition, since the bracket 61 with the extension portion 61a as illustrated in FIG. 7B is used, the supporting body 41 can be interposed between the flange portion 31 and the bracket 61 and the supporting body 41 made of a resin can be used to be bolt-fastened.

Finally, modification examples of the supporting body 41 described above will be described with reference to FIG. 9. Herein, FIGS. 9A, 9B, 9C and 9D illustrate top views of the modification examples of the supporting body, of which 9A is a first modification example, 9B is a second modification example, 9C is a third modification example and 9D is a fourth modification example. The same numerals are assigned to the same component parts as in the embodiments described above, and duplicated descriptions will be omitted.

Figure 9A:
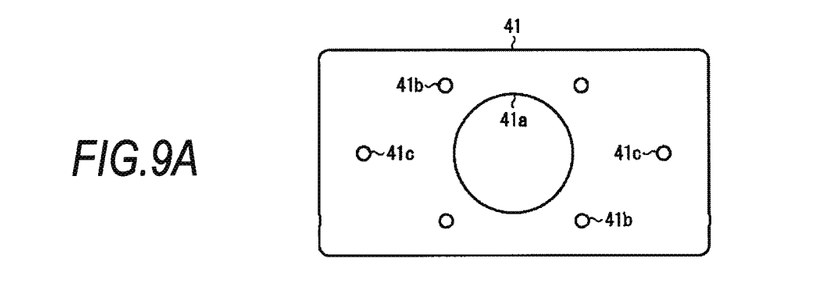
FIGS. 9A, 9B, 9C and 9D illustrate top views of modification examples of the supporting body, of which 9A is a first modification example, 9B is a second modification example, 9C is a third modification example and 9D is a fourth modification example.
Figure 9B:
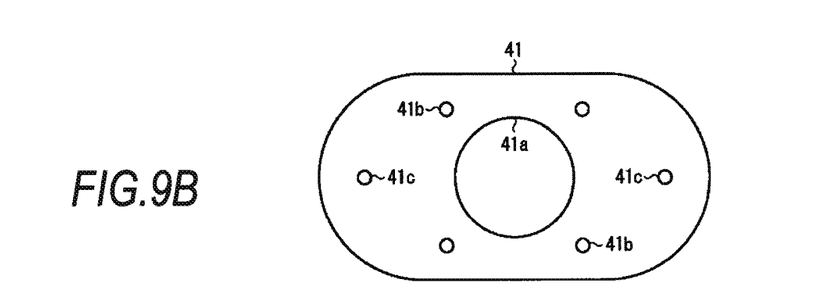
Figure 9C:
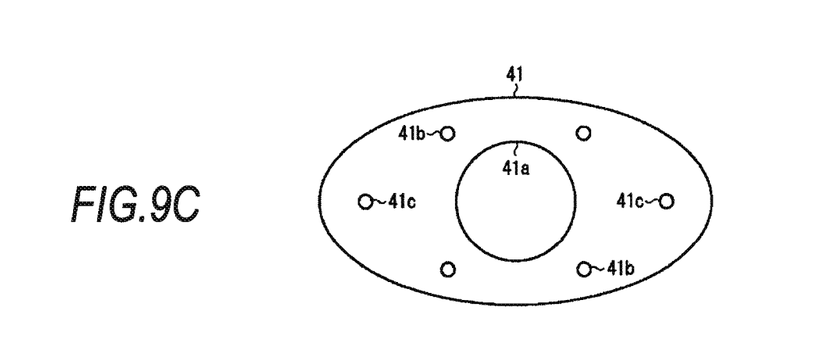
Figure 9D:
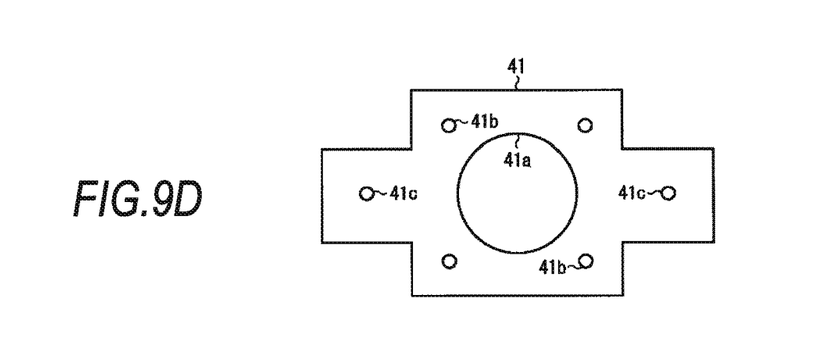

In the first modification example as illustrated in FIG. 9A, the supporting body 41 has a rectangular-shaped appearance. In this configuration, the appearance of the supporting body 41 can be formed in line with the shape of the inner case 52, and gaps between the supporting body 41 and the inner case 52 can be easily reduced. For example, when the supporting body 41 is made of a resin, the sufficient weight reduction of the supporting body 41 can be accomplished compared to retainers in the related art even though the supporting body 41 is increased in area.

The appearance of the supporting body 41 can be modified depending on conditions such as the type or model of the airbag device 1, the capacity or internal pressure of the airbag 2, supporting weight of the supporting body 41, the material or width of the belt-shaped body 42 and the rigidity of the inner case 52, and the appearance of the supporting body 41 is not limited to a polygonal shape such as a hexagonal shape or a rectangular shape. For example, the appearance of the supporting body 41 may have a track shape as in the second modification example in FIG. 9B; an elliptical shape as in the third modification example in FIG. 9C; or a cruciform shape (cross shape) as in the fourth modification example in FIG. 9D.

In the embodiments described above, cases, in which the present invention is applied to the front passenger seat airbag device, have been described. However, when the airbag device according to the present invention can adopt the same configuration as in the embodiments, the present invention may be applied to a driver seat airbag device, a side airbag device, a curtain airbag device, a knee airbag device, a pedestrian airbag device and the like.

The present invention is not limited to the embodiments described above, and other diverse modifications can be made in so far as the modifications do not depart from the scope and spirit of the present invention. For example, the first to fifth embodiments or the modification examples of the supporting body 41 can be appropriately combined for use.

The invention claimed is:

1. An airbag device comprising:
   an airbag that is folded under a normal condition and that is inflated and deployed in an emergency;
   an inflator that supplies gas to the airbag;
   a retainer that fixes the airbag and the inflator; and
   an airbag cover that accommodates the airbag,
   characterized in that the airbag cover includes a plate-shaped portion which configures an interior surface of a vehicle and an inner case which is arranged on a back surface of the plate-shaped portion to configure an inflation-deployment path of the airbag, and the inner case has a plurality of retaining holes for retaining the retainer, and
   the retainer includes a supporting body which has an approximately flat plate shape accommodable in the inner case and a belt-shaped body which is inserted into the retaining holes and installed onto the supporting body to form an annular shape.

2. The airbag device according to claim 1, characterized in that the belt-shaped body is made of a base fabric used on the airbag, webbing used on a seat belt, a thin plate-shaped metal, or a fiber material or a resin material which strength stands against a force and an impact caused by the inflation and deployment of the airbag.

3. The airbag device according to claim 1, characterized in that a portion of the belt-shaped body is connected to the airbag.

4. The airbag device according to claim 1, characterized in that the retaining holes are formed in a pair of wall surfaces which face each other approximately in a forward and backward direction of the vehicle or a pair of wall surfaces which configure the inner case in a longitudinal direction thereof; and formed in a pair of wall surfaces which face each other approximately in a left and right direction of the vehicle or a pair of wall surfaces which configure the inner case in a lateral direction thereof.

5. The airbag device according to claim 1, characterized in that the retaining holes have a shape in which the belt-shaped body can be retained in a loose fit state.

6. The airbag device according to claim 1, characterized in that the inner case has locking holes which lock the retainer in a loose fit state, and the retainer has hooks which are formed in the supporting body and can be locked into the locking holes.

7. The airbag device according to claim 6, characterized in that the retaining holes are formed in a pair of wall surfaces which face each other approximately in a forward and backward direction of the vehicle or a pair of wall surfaces which configure the inner case in a longitudinal direction thereof, and the locking holes are formed in a pair of wall surfaces which face each other approximately in a left and right direction of the vehicle or a pair of wall surfaces which configure the inner case in a lateral direction thereof.

8. The airbag device according to claim 1, characterized in that the belt-shaped body is fixed to the supporting body from an outside by use of a rivet or the belt-shaped body is fixed to the supporting body by use of a bolt and a nut.

9. The airbag device according to claim 1, further comprising:
   a backplate that fixes the airbag to a periphery of the inflator; and
   a bracket that connects the retainer to an in-vehicle structure,
   characterized in that the supporting body and the belt-shaped body are interposed between the backplate and the bracket to be fixed to each other by use of a bolt.

10. The airbag device according to claim 1, characterized in that the airbag cover is configured to be formed separately from an instrument panel of the vehicle to be fixed to the instrument panel, or the airbag cover is integrally formed with the instrument panel of the vehicle.

* * * * *